March 7, 1961 A. C. FLODSTROM ET AL 2,973,679
LEVER ACTUATED TRIMMING DEVICE HAVING TWISTED BLADES
Filed June 13, 1957
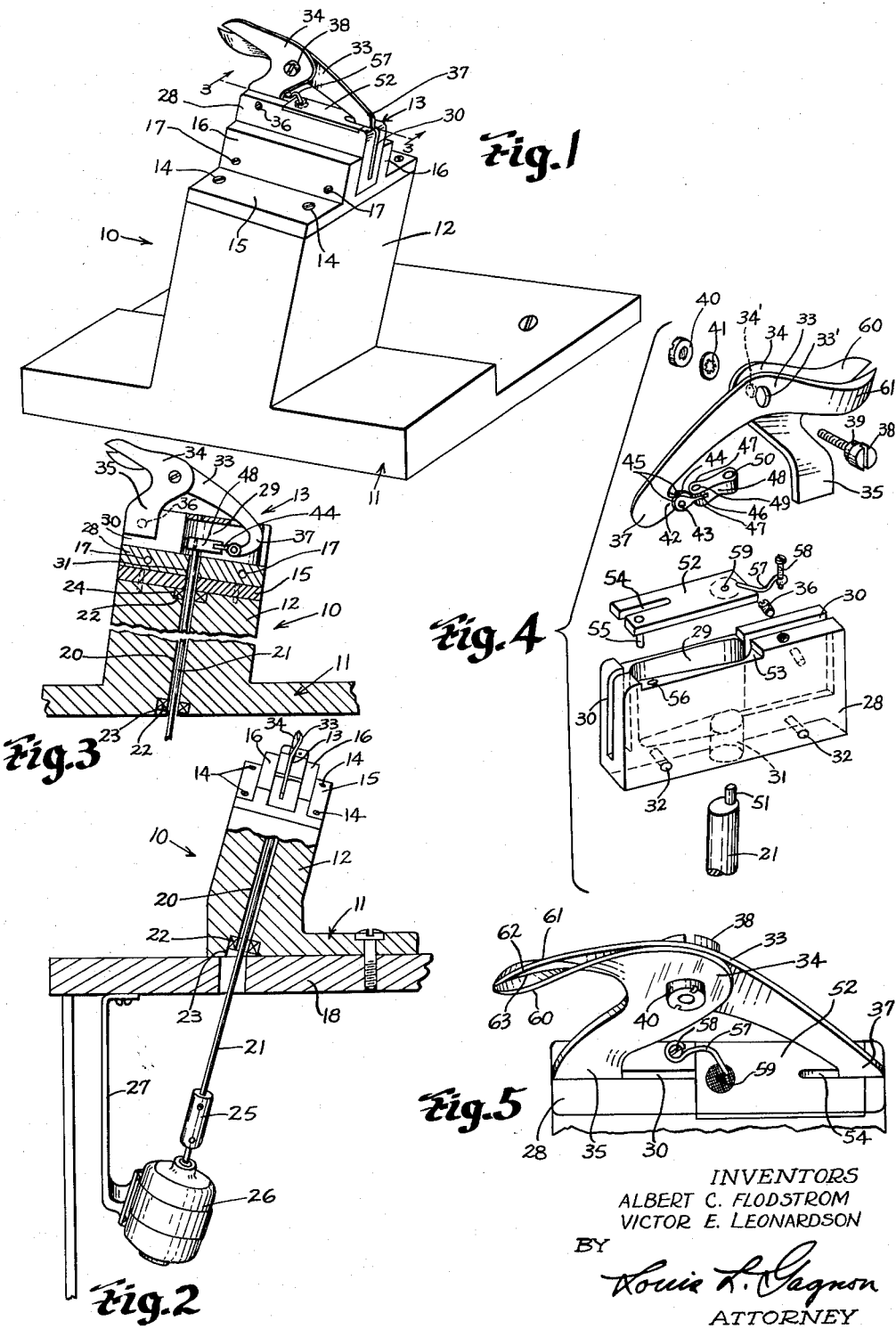
INVENTORS
ALBERT C. FLODSTROM
VICTOR E. LEONARDSON
BY
Louis L. Gagnon
ATTORNEY United States Patent Office 2,973,679
Patented Mar. 7, 1961

2,973,679

LEVER ACTUATED TRIMMING DEVICE HAVING TWISTED BLADES

Albert C. Flodstrom and Victor E. Leonardson, Putnam, Conn., assignors to American Optical Company, Southbridge, Mass., a voluntary association of Massachusetts Filed June 13, 1957, Ser. No. 665,456

2 Claims. (Cl. 83—605)

This invention relates to improvements in cutting or trimming devices and has particular reference to a device for trimming the contour edges of articles formed of rubber, plastic or the like.

The cutting out or trimming of articles formed of rubber or the like is extremely difficult due to the composition of the material and to its inherent elasticity and flexibility. In cutting a material of this nature in the known devices, the material has a tendency to bend and stretch into wedging relation between the blades. This will cause the material to tear instead of cut and will leave a ragged edge thereon which requires a further operation to acquire the desired smooth surface. This, of course, will slow down the operation and add to the cost of fabrication.

It is also difficult, if not impossible, with the known devices having straight blades or rotary cutting discs, to trim the inner contour edges of articles, particularly those having sharp corners or radii of small dimension.

The known devices of this nature are also extemely hazardous to operate an due to the extereme caution required of the operator, the trimming or cutting operations are, therefore, extremely slow.

It is, therefore, the principal object of the invention to provide a cutting or trimming device with which an operator may quickly and easily trim the contour edges of articles formed of rubber, plastic or the like, or which may be used for the cutting out of articles of intricate contour shape from a flat blank of said material.

Another object of the invention is to provide a cutting device with which an operator may cut or trim the inner contours of articles accurately and speedily.

Another object is to provide a cutting device having cutting blades so shaped and aligned with each other that the material being cut or trimmed will not wedge between them and will, therefore, produce a clean, smooth cut on the article being trimmed.

Another object is to provide a cutting device which will eliminate the usual hazards involved in devices of this matter.

Other objects and advantages of the invention will be apparent from the detailed description which follows when taken in connection with the accompanying drawings. It will be understood, however, that many changes may be made in the construction and arrangement of parts without departing from the spirit of the invention as expressed in the accompanying claims.

Referring to the drawings:

Fig. 1 is a perspective view of the device;

Fig. 2 is a partial sectional view of the device mounted on a bench;

Fig. 3 is a sectional view of the cutting head taken on lines 3—3 of Fig. 1;

Fig. 4 is an exploded view of the parts which make up the cutting head; and

Fig. 5 is a top plan view of the cutting head showing particularly the conformation of the cutting blades.

Referring to the drawings in detail and particularly to Fig. 1, 2 and 3, it will be seen that the device generally indicated by the numeral 10 and embodying the invention comprises a base 11 having an angled upright portion 12 for supporting the cutting head 13. As readily seen in referring to Figs. 1, 2 and 3, the angled upright portion 12 of the base 10 is angled so as to lean toward the operator. This is to locate the cutting blades of the cutting head 13 in a position for greater ease to the operator and for better visibility of the cutting line on the material to be cut or trimmed. The upright portion 12 is also angled, as shown in Fig. 2, in a direction normal to the first-described angle so as to position the plane of the cutting blades, at the cutting point, substantially normal to the base 11. This will allow the operator to hold the article being cut or trimmed parallel to the base for ease in manipulating.

Secured to the upper portion of the upright portion 12 of the base 11, by the screws 14, is a cutting head supporting member 15 having upright spaced ribs 16 between which the cutting head 13 is adapted to be positioned and secured by the screws 17.

The base 11 and upright portion 12 are provided with a central bore 20 extending throughout its length for receiving the cutter driving rod 21. A pair of bearings 22 are positioned within suitable counter-bores 23 and 24 in the base portion 11 and the upright portion 12 respectively to provide suitable support for the rod 21.

The cutter driving rod 21 is driven by and connected to, through a suitable flexible coupling 25, a conventional variable speed motor 26 which is secured to the bench 18 by a suitable hanger 27. The speed of the motor is varied in accordance with the texture and thickness of the material to be cut in order to obtain maximum cutting efficiency.

Referring more particularly to Figs. 3 and 4, the cutting head 13 has a blade supporting block 28 having a hollowed-out portion 29 extending downwardly from the top surface and having slots 30 extending from the hollowed out portion 29 to the outer end surfaces, and a bore 31 extending from the bottom of the hollowed-out portion 29 to the bottom of the block for receiving the end of the driving rod 21. Positioned in the lower part of the block 28, there is provided a pair of holes 32 through which the screws 17 are adapted to extend to secure the cutting head to the supporting member 15.

A pair of cutting blades 33 and 34 are adapted to be supported by the block 28 with the end 35 of the blade 34 rigidly secured within the slot 30, at one end of the block 28, by means of a clamp or set screw 36 and the blade 33, which is pivotally connected to the blade 34 intermediate their ends having an end portion 37 lying within the slot 30 at the opposed end of the block. The pivotal connection for the blades 33 and 34 comprises a screw 38 adapted to extend through suitable aligned openings 33' and 34' in the blades and having an enlarged shoulder 39 over which the opening 33' in the blade 33 is rotatably mounted and being of a length slightly longer than the thickness of said blade whereby the tightening of the nut 40 and washer 41 against the aligned blade 34 will not cause any binding on the blade 33 and will allow said blade to be freely actuated against the rigidly secured blade 34. The end 37 of the blade 33 is provided with a lobe 42 which is adapted to extend within the hollowed-out portion 29 of the block 28. Pivotally connected to the lobe 42 by a pivot pin 43 is a link member 44 which has a pair of spaced ears 45 overlying the opposed sides thereof and at its opposed end having a single ear 46 lying in a plane normal to the plane of the ears 45 which is adapted to be pivotally mounted between the ears 47 of a link member 48 by means of a pin 49. The link member 48 is provided with an opening 50 in its opposed end for receiving an eccentrically positioned drive pin 51 located on the end of the drive rod 21 which is adapted to extend through the opening 31 in the block 28 and into the hollowed-out portion 29.

It will readily be seen that upon rotation of the drive rod 21, by the motor 26, and the eccentric drive pin 51, that motion transmitted through the links 44 and 48 will actuate the blade 33 about the pivot member 38 to obtain the desired shearing action against the stationary blade 34.

A removable cover plate 52 is provided to overlie the hollowed-out portion 29 of the block 28 and is adapted to seat within a cut-out portion 53 so as to lie flush with the top surface thereof. The cover plate 52 has an open slot 54 extending from one end which will straddle the end 37 of the cutting blade 33. A pin 55 extending downwardly from the cover plate 52 is adapted to seat within an opening 56 in the block 28 to keep the plate from being displaced in a sidewise direction and a swingable retaining or latch member 57 pivotally secured to the block 28 by the screw 58 will hold the cover in place in the cut-out portion 53. It will readily be seen that to remove the cover to disassemble the device, the member 57 may be swung about the screw 58 and the cover lifted off. An opening 59 is provided in the cover for the lubrication of the moving parts within the hollowed-out portion 29.

The cutting ends 60 and 61 of the blades 33 and 34, as shown best in Fig. 5, are respectively curved in a sidewise direction and are provided with oppositely beveled cutting edges 62 and 63. The blades are further each provided with a slight reverse bend in the direction of the longitudinal plane of the side surfaces thereof intermediate the pivot 38 and the outer free ends thereof and are so shaped as to have only a sliding point contact with each other throughout the length of the cutting or shearing stroke of one against the other. The remaining portions of the edges assume a spaced relationship with each other so that the material being cut will not be dragged into binding relation therebetween. This will prevent the forming of ragged or torn edges on the material being cut or trimmed and will insure that a smooth cut is obtained. It might be said that the shaping of the cutting ends 60 and 61 is such that the cutting edges 62 and 63 cross each other at the point of contact throughout the length of the cutting stroke and will, therefore, space the adjacent side surfaces from each other.

In operation, the device is set upon a bench with the cutting ends facing away from the operator so that the material or article being worked upon may be pulled into the blades, instead of pushed, which is desirable when cutting rubber or like material. The operator having both hands free to manipulate the article simply draws a side edge thereof in between the ends of the cutting blades and thence follows a prescribed contour in guiding the article throughout the remainder of the cut desired by gently pulling and turning the article.

The ends of the cutting blades are substantially pointed so that when trimming out an inner contour from a solid piece, the operator simp'y forces the ends through the central portion of the material to start the cut.

It has been found that the movable cutting blade should be actuated approximately 2000 times a minute for best cutting results for rubber, plastic or the like.

It is to be noted that the cutting stroke of the blades is intentionally made very short and, therefore, does not permit the blades to open relative to each other by an amount sufficient to enable an operator to catch his fingers therebetween, thus greatly reducing such a hazard encountered in prior art devices. This will substantially speed up the operation and greatly reduce the cost.

From the foregoing description, it will be seen that simple, efficient and economical means have been provided for accomplishing all the objects and advantages of the invention. While the novel features of the invention have been shown and described and pointed out in the annexed claims, it will be understood that changes may be made in the details of construction without departing from the spirit of the invention. We, therefore, do not wish to be limited to the exact details shown and described as the preferred form only is set out by way of illustration.

We claim:

1. A power cutting device comprising a block having a central hollowed-out portion, an opening in the base of the block communicating with the hollowed-out portion, a first slot extending inwardly of the upper front portion of the block and communicating with the hollowed-out portion, a second slot extending inwardly of the upper rear portion of the block communicating with the hollowed-out portion and in substantially aligned relation with the first slot, a first blade having an angularly disposed end portion fitted and secured within the first slot with said blade extending forwardly of said block, a second blade pivotally connected intermediate its ends to said first blade and having an end portion on the side of the pivot opposite its blade portion extending into said second slot with a part thereof extending into the hollowed-out portion, said blades both being curved in a sidewise direction and having a slight reverse bend in the direction of the longitudinal planes of the side surfaces thereof and having oppositely beveled engaging cutting edges so shaped as to have only a sliding point contact with each other throughout the length of their cutting strokes, a drive rod extending through said opening in the base of the block, an eccentric member on said rod lying within the hollowed-out portion of the block, link means connecting said eccentric member with the end part of said second blade which lies within said hollowed-out portion and means for imparting a rotary movement to said rod to bring about said cutting strokes.

2. A power cutting device comprising a block having a central hollowed-out portion opening outwardly of the top of the block, an opening in the base of the block communicating with the hollowed-out portion, a first slot extending inwardly of the upper front portion of the block and communicating with the hollowed-out portion, a second slot extending inwardly of the upper rear portion of the block communicating with the hollowed-out portion and in substantially aligned relation with the first slot, a first blade having an angularly disposed end portion fitted and secured within the first slot with said blade extending forwardly of said block, a second blade pivotally connected intermediate its ends to said first blade and having an end portion on the side of the pivot opposite its blade portion extending into said second slot with a part thereof extending into the hollowed-out portion, a cover plate overlying the hollowed-out portion and having a slot straddling the portion of the second blade extending into said second slot, means for removably securing said cover plate in said overlying position, said blades both being curved in a sidewise direction and having a slight reverse bend in the direction of the longitudinal planes of the side surfaces thereof and having oppositely beveled engaging cutting edges so shaped as to have only a sliding point contact with each other throughout the length of their cutting strokes, a drive rod extending through said opening in the base of the block, an eccentric member on said rod lying within the hollowed-out portion of the block, link means connecting said eccentric member with the end part of said second blade which lies within said hollowed-out portion and means for imparting a rotary movement to said rod to bring about said cutting strokes.

References Cited in the file of this patent

UNITED STATES PATENTS

| | | |
|---|---|---|
| 579,085 | Wesselmann | Mar. 16, 1897 |
| 2,759,540 | Bonneau | Apr. 21, 1956 |